United States Patent
Melhem et al.

[11] Patent Number: 5,880,949
[45] Date of Patent: Mar. 9, 1999

[54] SOFT SWITCHING POWER CONVERTER COMPRISING MEANS FOR CORRECTING THE MEDIAN VOLTAGE OF A CAPACITIVE VOLTAGE DIVIDER

[75] Inventors: Wissam Melhem; Khaled Elloumi, both of Cachan; Stéphane Cazabat, Massy; Christian Delay, Morangis; Hervé Pouliquen, Clamart, all of France

[73] Assignee: Alcatel Alsthom Compagnie Generale D'Electricite, Paris, France

[21] Appl. No.: 936,198

[22] Filed: Sep. 23, 1997

[30] Foreign Application Priority Data

Sep. 24, 1996 [FR] France .................... 96 11595

[51] Int. Cl.⁶ .................................. H02M 7/521
[52] U.S. Cl. .............................. 363/96; 363/138
[58] Field of Search ................... 363/95, 96, 98, 363/132, 136, 138

[56] References Cited

U.S. PATENT DOCUMENTS

| | | | |
|---|---|---|---|
| 4,336,585 | 6/1982 | Moriarty et al. | 363/136 |
| 4,443,841 | 4/1984 | Mikami et al. | 363/132 |
| 4,670,828 | 6/1987 | Shekhawat et al. | 363/132 |
| 5,047,913 | 9/1991 | De Doncker et al. | 363/138 |
| 5,361,196 | 11/1994 | Tanamachi et al. | 363/98 |
| 5,450,306 | 9/1995 | Garces et al. | 363/98 |
| 5,467,262 | 11/1995 | Nakata et al. | 363/98 |
| 5,506,765 | 4/1996 | Nakata et al. | 363/132 |
| 5,621,634 | 4/1997 | Sato | 363/96 |

FOREIGN PATENT DOCUMENTS

WO9205625  4/1992  WIPO ............ H02M 7/5387

OTHER PUBLICATIONS

R. W. De Doncker et al, "The Auxiliary Quasi–Resonant DC Link Inverter", *Proceedings of the Annual Power Electronics Specialists Conference,* Massachusetts, 25–27 Jun., 1991, No. Conf. 22, 23 Jun. 1991, Institute of Electrical and Electronics Engineers, pp. 248–253 XP000293058.

W. McMurray, "Resonant Snubbers with Auxiliary Switches", IEEE Transactions on Industry Applications, vol. 29, No. 2, 1 Mar. 1993, pp. 355–361, XP000369395.

*Primary Examiner*—Jeffrey Sterrett
*Attorney, Agent, or Firm*—Sughrue, Mion, Zinn, Macpeak & Seas, PLLC

[57] ABSTRACT

A power converter comprises two main switches connecting an output either to the positive rail or to the negative rail. Two freewheel diodes for maintaining the current in the load, two snubbers and an auxiliary circuit including an auxiliary inductor in series with two auxiliary switches connected between the output and a mid-point of a capacitive voltage divider supplying a median voltage. Any error of the median voltage relative to its nominal value is evaluated and the main switches are additionally commanded, depending on the direction of the error, for a time period dependent on the amplitude of the error, in order to cause an additional current in the auxiliary circuit to correct the error at least in part.

8 Claims, 2 Drawing Sheets

SOFT SWITCHING POWER CONVERTER COMPRISING MEANS FOR CORRECTING THE MEDIAN VOLTAGE OF A CAPACITIVE VOLTAGE DIVIDER

BACKGROUND OF THE INVENTION

1. Field of the Invention

The present invention concerns soft switching power converters, in particular the power converters described in the article "High Power Transistor Inverters—Potential for Single Device Operation at 1000 A and 800 V", by G. A. Fisher published in the minutes of the "16th Universities Power Engineering Conference", Sheffield, Great Britain, in the article "Resonant Snubbers with Auxiliary Switches", by W. McMurray, published in IEE Transactions on Industry Applications, Vol.29, No.2, March/April 1993, and in patent document WO 92/05625.

2. Description of the Prior Art

FIG. 1 shows a converter leg of the type described in the publications mentioned. This converter leg is adapted to power a load L, shown as essentially inductive in nature, for example a motor, from a direct current voltage supply provided between a positive rail VR+ and a negative rail VR−. It essentially comprises:

- two main switches S1 and S2 respectively connecting an output S leading to the load L either to the rail VR+ or to the rail VR−,
- two freewheel diodes D1 and D2 for maintaining the current in the load L by respectively coupling the output S either to the positive rail VR+ or to the negative rail VR−,
- two snubbers C1 and C2 between the output S and the positive rail VR+ and the negative rail VR−, respectively,
- an auxiliary circuit CA including an auxiliary inductor LA in series with two antiparallel unidirectional conduction auxiliary switches T1 and T2, for example thyristors, or functionally equivalent circuits, connected between the output S and the mid-point M of a capacitive voltage divider DC; the latter in turn comprises two divider capacitors CV1 and CV2 connected in series between the positive and negative rails VR+ and VR− and supplying at this mid-point M a nominal median voltage relative to those of the positive and negative rails VR+ and VR−.

In this circuit, the components S1, D3, C1, T1, CV1 are respectively paired with components S2, D2, C2, T2, CV2, i.e. they have the same electrical characteristics at all times. A control circuit, not shown, measures voltages and currents at various points of the converter including this leg and commands switching of the main switches S1 and S2 and the auxiliary switches T1 and T2 in accordance with an appropriate program, by action at control electrodes that are merely sketched in in the figure, at ec1, for example, in the manner now to be described.

To illustrate the operation of this circuit in the case of a DC—DC converter, the leg from FIG. 1 operating as a chopper, the starting state is one in which no switch is turned on and a current I$_L$ is maintained in the load L by the freewheel diode D2 which is turned on at this time. Accordingly, ignoring the threshold voltage of the diode D2, the output S is at the same potential as the rail VR−, for example 0 volt. The capacitors CV1 and CV2, which have the same capacitance, are charged to the voltage +V between the rails VR+ and VR−, with the result that the mid-point M is at the median voltage +V/2.

Commutation of the circuit begins with a first step in which the auxiliary switch T1 is turned on by the control circuit. The auxiliary inductor LA is energized between +V/2 (ignoring the threshold of V1) and 0 V (ignoring the threshold of D2); the current I$_A$ through it increases linearly. This current is subtracted from the current I$_L$ in the diode D2.

When I$_A$=I$_L$ the diode D2 turns off. The output S is no longer connected to the rail VR−. The auxiliary inductor LA is then in series with the capacitors C1 and C2, which as far as it is concerned are in parallel with each other. An oscillatory current arises between the inductor and the capacitors. In the first half-wave of this oscillation the mid-point of the snubbers C1 and C2, i.e. the output S, goes from 0 to +V volts.

The switch S1 is then turned on, with no voltage across it, and takes the current I$_L$. The current I$_A$ flowing through the inductor LA, now connected between the mid-point M, at the potential +V/2, and the output S, maintained at the potential +V via the switch T1, decreases linearly. When it falls to zero the auxiliary switch T1 turns off. For this reason a thyristor type switch is employed, which has the property of turning off when the current passing through it falls to zero, or any equivalent combination of components, a transistor or an IGBT in series with a diode, for example.

Commutation in the other direction, to return to the initial situation, is accomplished in a similar fashion, using the auxiliary circuit CA, the auxiliary switch T2 of which is turned on, as the auxiliary switch T1 was before. Moreover, the switch S1 is then also turned off. The voltage at the output S then goes from +V to 0 volts in one oscillation at the end of which the auxiliary switch T2 turns off, the diode D2 then turning on due to the effect of the current I$_L$.

Other modes of use of the converter leg described can be envisaged, in particular that of FIG. 2 in which the load is connected between two converter legs identical to that of FIG. 1, the components of the second leg carrying the same reference numbers as the first with the addition of a "'". Additionally, and as a variant, the inductors LA and LA' are connected between the auxiliary switches and the point M, instead of being connected between these auxiliary switches and the point S; this does not change anything with regard to the operation as described here. Other modes of operation can be applied in a two-leg converter such as that shown in FIG. 2, in particular inverter operation. The operation of each of the two legs is tied to what has just been described. In chopper mode operation, the operation of the lefthand leg alternately involves the diode D2 and switch T1, while, synchronously, the operation of the righthand leg involves the diode D1' and the switch T2'. In inverter operation, after a positive half-cycle, or several parts of a positive half-cycle, in accordance with what has just been stated, a negative half-cycle will involve, on one side, the diode D1 and then the switch T2 and, on the other side, the diode D2' and then the switch T1.

In these various situations, the voltage is switched at the output S of a converter leg without losses if the voltage at the output S goes from 0 to +V volts, that is to say if the voltage across the auxiliary circuit CA is reversed, that is to say if the voltage at the point M is equal to +V/2. For this, the capacitances of the capacitors CV1 and CV2 of the voltage divider DC must be sufficiently high and the symmetry of the components involved in the conduction phases of the auxiliary circuit must be quasi-perfect. Experience shows that these conditions are difficult to meet and this constitutes a problem.

In the case of the symmetrical converter from FIG. 2, it will be noted that the two legs share the same voltage divider DC. The currents required of this voltage divider are in opposition and in principle equal. However, the problem referred to above nevertheless arises in practice.

The skilled person will easily envisage an application of the converter just described in the context of a three-phase circuit. The same problem is still present.

The invention supplies an effective, low-cost solution to this problem.

SUMMARY OF THE INVENTION

In accordance with the invention, the power converter further comprises means for evaluating an error of the median voltage relative to its nominal value and means for additionally commanding one or the other of the main switches, depending on the direction of the error, for a time period dependent on the amplitude of the error, in order to cause an additional current in the auxiliary circuit adapted to correct the error at least in part.

The evaluation preferably includes instantaneous comparison of the median voltage and the nominal value, supplying an instantaneous error signal to which is applied a proportional/integral operator supplying a correction signal. The evaluation also includes the determination of the modulus and of the sign of the correction signal.

In the case of a converter having at least two legs, the control means include means for evaluating the direction of the current in the load.

The control means preferably include combinatorial logic selecting the main switch to be additionally commanded in accordance with the direction of said error.

In the case of a converter having at least two legs, the control means include combinatorial logic selecting the main switch to be additionally commanded in accordance with the direction of said error and the direction of said current in the load.

The additional command turns on the selected switch or leaves it turned on for a period depending on the modulus of the correction signal.

The various objects and features of the invention will now be explained in more detail in the following description of one embodiment of the invention given by way of non-limiting example and with reference to the accompanying drawings.

DETAILED DESCRIPTION OF THE PREFERRED EMBODIMENT

Figure 1:
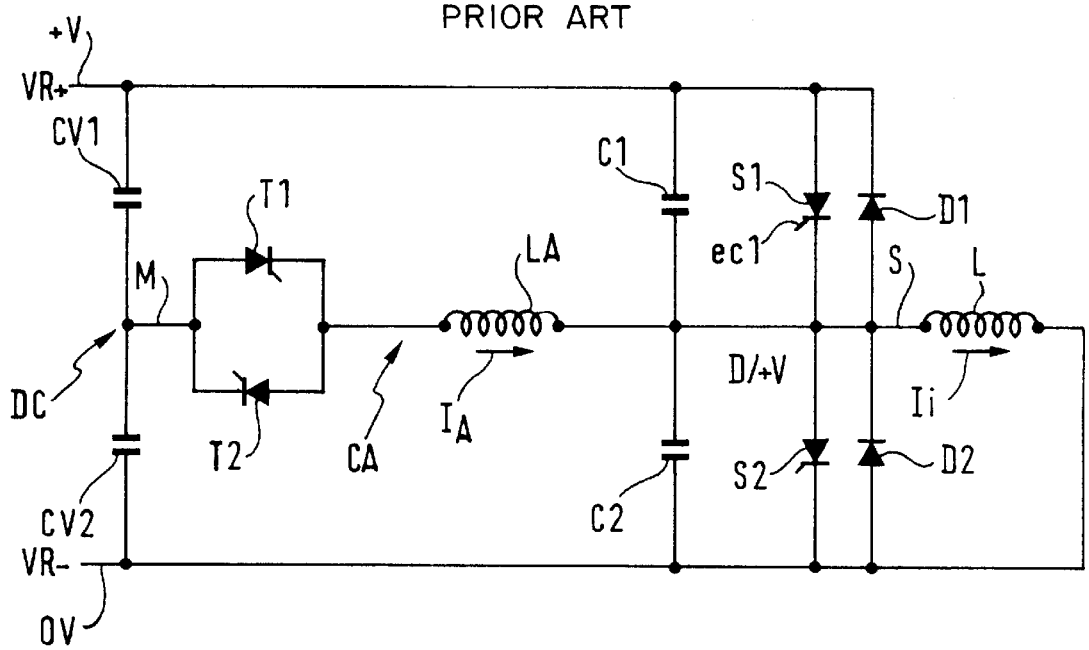
FIG. 1, already described, shows the circuit schematic of a power converter leg of a type known in itself to which the present invention applies.
Figure 2:
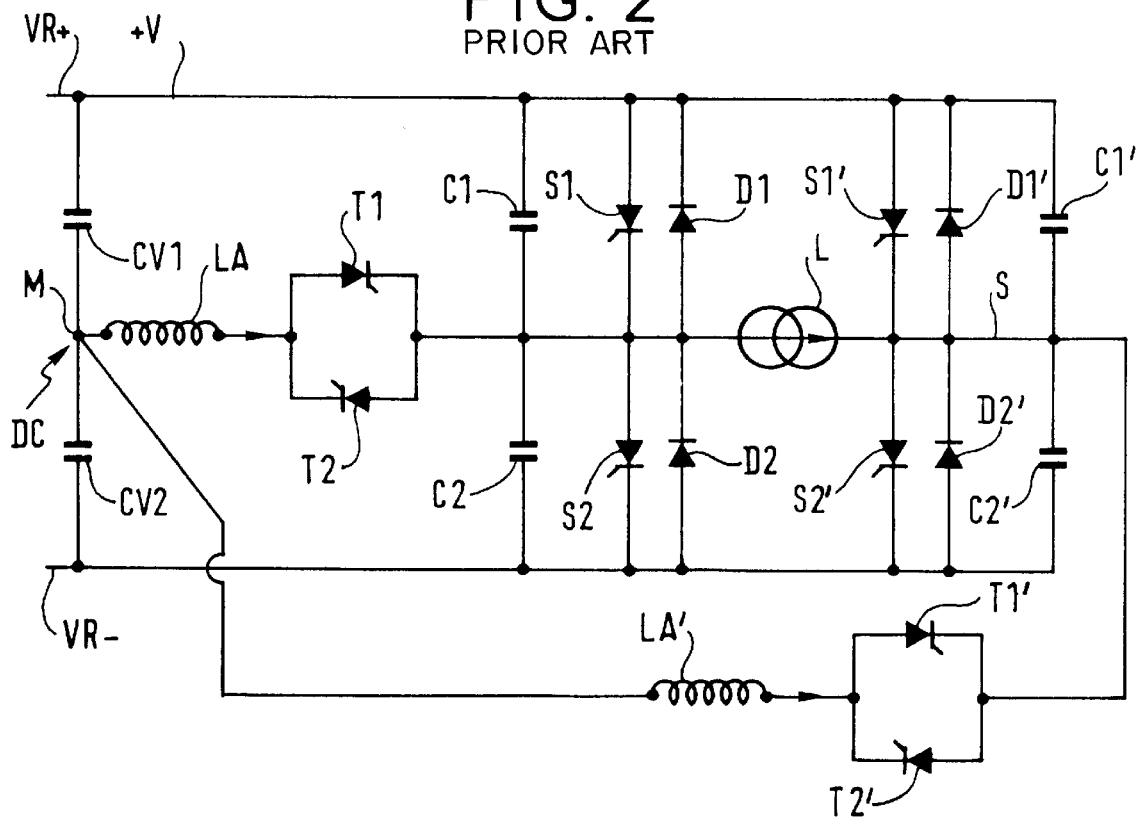
FIG. 2, also described already, shows the circuit diagram of a power converter of a type known in itself to which the present invention applies.
Figure 3:
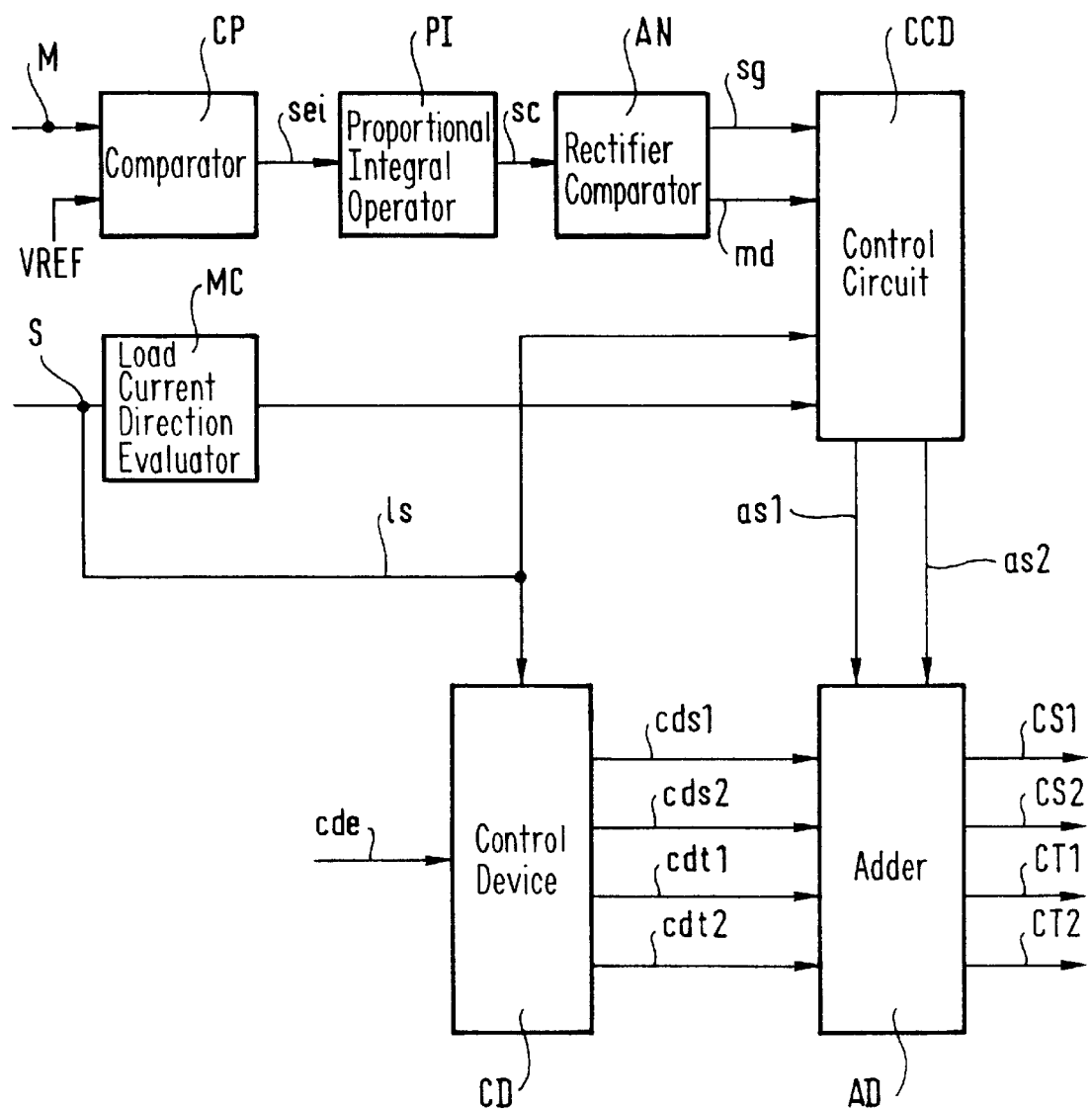
FIG. 3 shows the means provided in accordance with the invention for controlling a converter leg like that from FIG. 1.

The embodiment of the invention shown in FIG. 3 is adapted to control the operation of the converter leg from FIG. 1 or that of one of the converter legs from FIG. 2. Accordingly, the device from FIG. 3 is connected to point M in FIG. 1 to evaluate the median voltage at this point, to the point S to evaluate the voltage at this point and the current in the load L, and to the control electrodes of the main switches S1 and S2, via outputs CS1 and CS2, and to the control electrodes of the auxiliary switches T1 and T2, via outputs CT1 and CT2.

The coupling modes just mentioned will not be described further. This aspect is part of the art well known to the skilled person.

In a first application, a converter comprising only the converter leg from FIG. 1, the operation of which is described at the beginning of this text, will be considered.

Accordingly, the device from FIG. 3 generally comprises a control input cde applied to a control device CD which, including for this purpose a timebase that is not shown, supplies signals at its outputs cds1, cds2 the duration and/or the position in time of which depend(s) on the control signal cde. These signals are applied to the control electrodes of the main switches S1 and S2, respectively via an adder AD which forwards them normally, in a manner described below, to its outputs CS1 and CS2. In response to the control signal cde, the control device CD also supplies signals at its outputs cdt1 and cdt2. These signals are fed to the control electrodes of the auxiliary switches T1 and T2 via the adder AD that normally retransmits them to its outputs CT1 and CT2 (see below for an explanation of how this is done.

In the example of operation previously given, the control device CD therefore supplies firstly the signal cdt1 to turn on the auxiliary switch T1 at the start of a commutation operation. This signal cdt1 can be a short pulse if the auxiliary switch T1 is a thyristor, for example; alternatively, it can be maintained until the time arrives to turn off the auxiliary switch T1. The control device CD then produces the signal cs1 to turn on the main switch S1, from the appropriate time, i.e. from the end of one half-cycle of oscillation of the circuit comprising the auxiliary inductor LA and the snubbers C1 and C2, when the voltage at the point S becomes equal to +VR, of which it is informed via a link is that connects it to the point S. The main switch S1 being an IGBT, for example, the signal cs1 is maintained by the control device CD for as long as the switch must remain turned on, generally in accordance with the control signal cde.

Commutation in the other direction, as described in the preamble, is commanded by the control device which produces the signal cs2 and which then interrupts the signal cdt1, at the appropriate time, in accordance with operation as described.

The device from FIG. 3 includes a device MC for evaluating the direction of the current in the load L. This device MC has an input connected to the point S and an output connected to an input of the control circuit CCD. The device from FIG. 3 further includes means CP, PI, AN for evaluating any error of said median voltage V/2 relative to its nominal value and means CCD, AD for additionally commanding one or other of the main switches S1 and S2, depending on the direction of said error, for a time period dependent on the amplitude of said error, in order to cause an additional current in said auxiliary circuit of a kind to correct said error at least in part.

To be more precise, said evaluation includes a comparison in a comparator CP receiving the instantaneous value of said median voltage sampled at the point M and a nominal voltage value VREF supplied by an appropriate voltage source, not shown. This comparator CP supplies an instantaneous error signal sei the amplitude of which is equal to the algebraic difference between these two voltages and which is applied to a proportional/integral operator PI supplying in exchange a correction signal sc. Said evaluation also includes the determination of the modulus md and of the sign sg of the correction signal sc in an equipment AN that can take the form of the combination of a rectifier and a comparator to 0. The signal representative of the modulus md and that which represents the sign sg are supplied to a control circuit CCD. This control circuit CCD produces a pulse at an output as1 or another output as2, depending on the sign of the error determined, the duration of which optionally depends on the modulus of the error.

If the voltage at the point M is too high, the pulse in question is supplied at the output as2 and the adder forwards it to its output CS2. This occurs when the current falls to zero in the diode D2, which is reflected in a variation in the potential at the point S, which the control circuit CCD also receives via the link ls.

The effect of the signal transmitted in this way to the main switch S2 is to maintain the potential VR– at the point S and therefore to extend the duration of the current in the inductor LA, which increases the charge on the divider capacitor CV1 and reduces that on the divider capacitor CV2, so reducing the voltage at the point M. Thus the error initially observed tends to be reduced. It can even be virtually eliminated if the duration of the signal as2 is exactly calibrated as a function of the modulus md. A simpler approach is an incremental correction, however.

The correction of an error in the other direction (the signal sg being of the opposite sign) gives rise to a signal cs1 that extends the duration for which the main switch S1 is turned on, rather than being turned off as soon as the auxiliary switch T2 is switched. The effect is the same, but in the opposite direction.

Thus it is a simple matter to correct any error in the median voltage supplied by the capacitive voltage divider DC on the basis of the operation of a single converter leg, like that from FIG. 1. This of course remains the case in the case of a converter with two or more legs, like that from FIG. 2. However, it will also be observed that in the case of the converter from FIG. 2, because the two legs conduct in opposite directions, one leg can be used for correction in one direction and the other leg for correction in the other direction. Accordingly, it will be sufficient to provide an additional phase of conduction of the main switch S2, like that described previously, or, for a correction in the opposite direction, a similar additional phase of conduction of the main switch S2'.

Of course, the division into blocks illustrated by FIG. 3 and described in the foregoing is in no way obligatory and is given purely by way of illustration; other arrangements of the functions described are possible, the logic functions of the devices CCD, CD, AD possibly being accomplished by one or more processors, possibly of the programmed logic type, depending on the available technology.

There is claimed:

1. A power converter comprising at least one leg including, between a positive rail and a negative rail two main switches for respectively connecting an output leading to a load either to said positive rail or to said negative rail, two freewheel diodes for maintaining a current in said load by respectively coupling said output to said positive rail or to said negative rail, two snubbers between said output and said positive rail and said negative rail, respectively, an auxiliary circuit including an auxiliary inductor in series with two antiparallel unidirectional conduction auxiliary switches connected between said output and a mid-point of a capacitive voltage divider itself including two divider capacitors connected in series between said positive and negative rails and supplying at this mid-point a nominal median voltage relative to those of said positive and negative rails, said power converter further including means for evaluating an error of said median voltage relative to its nominal value and means for additionally commanding one or the other of said main switches, depending on the direction of said error, for a time period dependent on the amplitude of said error, in order to cause an additional current in said auxiliary circuit adapted to correct said error at least in part.

2. The power converter claimed in claim 1 wherein said evaluation includes an instantaneous comparison of said median voltage and of said nominal value supplying an instantaneous error signal to which is applied a proportional/integral operator supplying a correction signal.

3. The power converter claimed in claim 2 wherein said evaluation also includes the determination of the modulus and of the sign of said correction signal.

4. The power converter claimed in claim 3 wherein in the case of a converter with at least two legs, said control means include means for evaluating the direction of the current in said load.

5. The power converter claimed in claim 3 wherein said control means include combinatorial logic selecting the main switch to be additionally commanded in accordance with the direction of said error.

6. The power converter claimed in claim 5 wherein said additional command turns on said selected main switch or keeps it turned on for a time period dependent on said modulus of said correction signal.

7. The power converter claimed in claim 4 wherein said control means include combinatorial logic selecting the main switch to be additionally commanded in accordance with the direction of said error and the direction of said current in the load.

8. The power converter claimed in claim 7 wherein said additional command turns on said selected main switch or keeps it turned on for a time period dependent on said modulus of said correction signal.

* * * * *